W. MARX.
COASTER AND BRAKE MECHANISM.
APPLICATION FILED JUNE 18, 1910.

1,010,933.

Patented Dec. 5, 1911.

2 SHEETS—SHEET 1.

Witnesses.

Inventor.
Wilhelm Marx

W. MARX.
COASTER AND BRAKE MECHANISM.
APPLICATION FILED JUNE 18, 1910.

1,010,933.

Patented Dec. 5, 1911.
2 SHEETS—SHEET 2.

Witnesses.

Inventor.

UNITED STATES PATENT OFFICE.

WILHELM MARX, OF DUSSELDORF, GERMANY, ASSIGNOR TO SCHWEINFURTER PRÄCISIONS-KUGEL-LAGER-WERKE FICHTEL & SACHS, OF SCHWEINFURT, GERMANY, A FIRM.

COASTER AND BRAKE MECHANISM.

1,010,933.  Specification of Letters Patent.  Patented Dec. 5, 1911.

Application filed June 18, 1910. Serial No. 567,591.

*To all whom it may concern:*

Be it known that I, WILHELM MARX, a subject of the King of Prussia, residing at No. 121 Friedrichstrasse, Dusseldorf, in Germany, have invented certain new and useful Improvements in Coaster and Brake Mechanism, of which the following is a specification.

This invention relates to free wheel hubs for cycles and like vehicles combined with back-pedaling brake-mechanism arranged within the hub-barrel.

The invention more particularly relates to that construction of free-wheel hubs in which the driving clutch is formed by an overrunning coupling gear of the well-known type having antifriction-members contained in pockets and housed in recesses of a suitably disposed spacer-ring.

The object of the invention is to provide an appliance of the said nature, which is simple in structure, easy to be disassembled, reliable in operation, and cheap in manufacture. This object is attained by combining the driving gear with an expansile brake sleeve in such a manner that the sleeve constitutes the spacer or guiding ring of the clutch rollers, thus directly controlling the driving gear and diminishing dead motion at the same time.

Another object of the invention is to provide means by which the said rollers are able to expand the brake sleeve themselves without special means for that purpose, thereby further reducing the number of the single elements required for the operation of the mechanism.

A further object of the invention is to give the recesses of the combined brake and roller-retaining sleeve special inclined faces engaged by the rollers in their inverse motion, whereby the brake is immediately applied.

Apart from having dispensed with a number of parts, this structure presents the least possible amount of stroke between driving and braking, when rotating the driver forward or backward respectively.

This invention is more specially described hereinafter with reference to the accompanying drawing which is to be taken as a part of this specification, and in which is—

Figure 1:
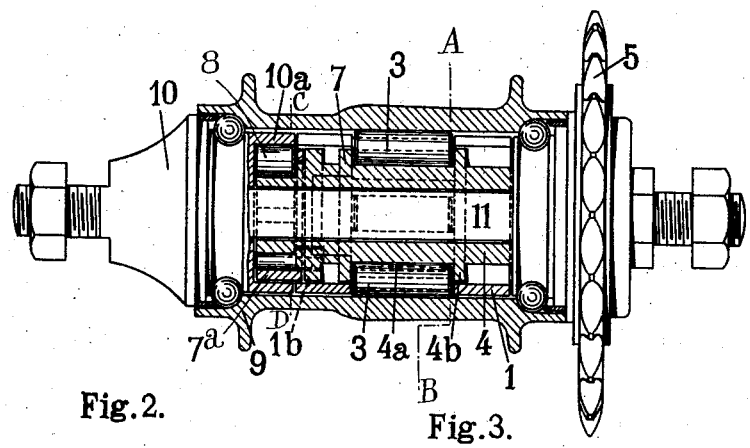
Figure 2:
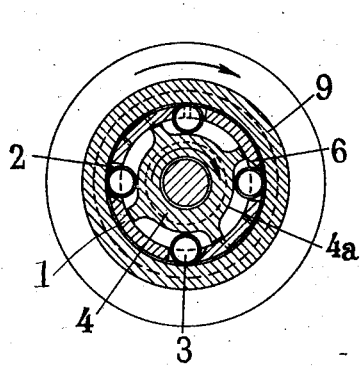
Figure 3:
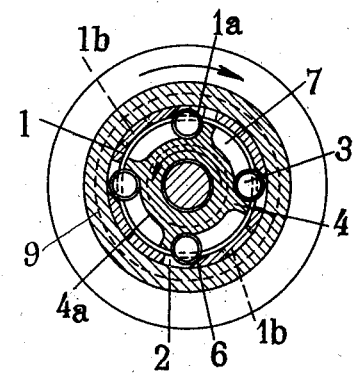
Figure 4:
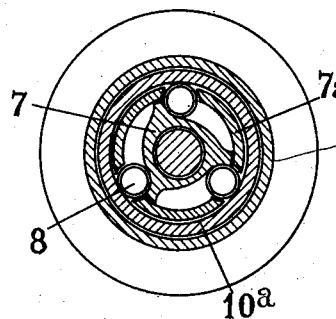
Figure 5:
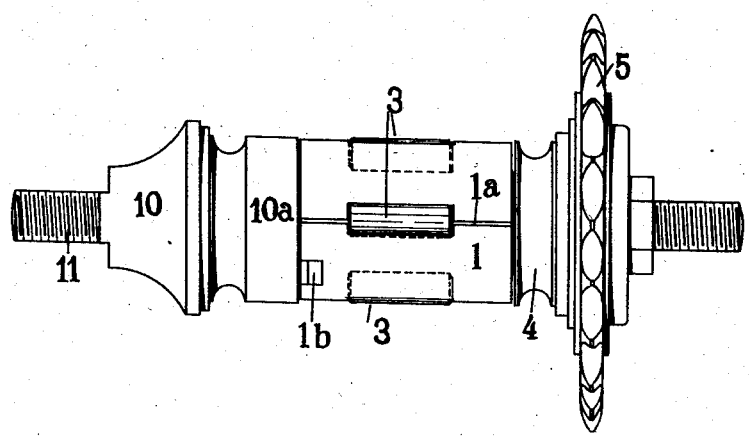
Figure 6:
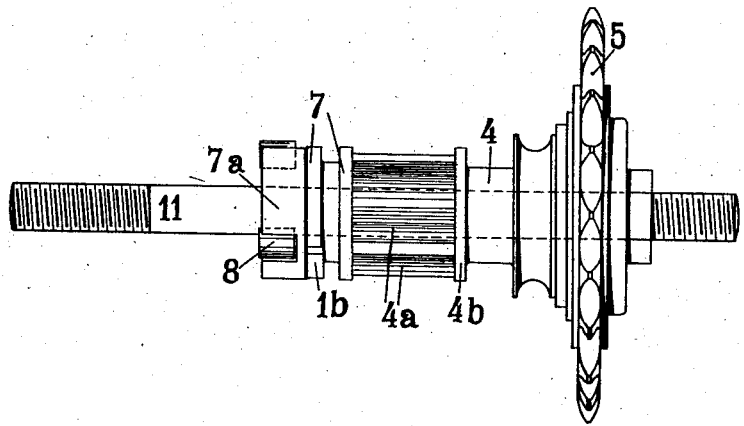

Figure 1 a longitudinal section of a driving and brake mechanism according to the aforesaid invention, Fig. 2 a cross-section of the device on the line A—B of Fig. 1, showing the gear in the driving position, Fig. 3 a similar cross-section in which the brake is represented as to be applied, and Fig. 4 a cross-section on the line C—D of Fig. 1. Fig. 5 is a side-elevation of the parts located within the hub sleeve, and Fig. 6 shows the driving sleeve and the adjacent clutch mechanism in side elevation.

Like numerals denote like parts throughout all figures of the drawing.

Upon the outer end of a driving sleeve 4 located in the hub barrel 9 and rotatably supported upon the fixed axle 11 of the rear wheel of a cycle, is rigidly mounted in any suitable manner a gear wheel, such as for example a sprocket wheel 5. Pockets or depressions $4^a$ having inclined bottoms which gradually ascend outwardly in the direction of the rearward rotation of the mechanism (see Figs. 2 and 3), are formed in the periphery of the sleeve 4, antifriction-members, such as rollers 3 being located and confined therein in the axial direction by the end walls $4^b$ of the said pockets on one side and by a ring 7 on the opposite side. A cylindrical sleeve 1 longitudinally slit at $1^a$ and perforated at convenient places, so as to receive and embrace the said rollers 3 in the apertures 2, is mounted upon the driving sleeve 4 which carries it along together with the rollers 3 in its forward rotation. Said sleeve 1 constitutes an expansible brake-cylinder, and also serves as a guide ring or spacer for the rollers 3 of the driving clutch coupling. At its left end the brake cylinder 1 is connected with a clutch member adapted to prevent its backward rotation, by coupling it with a stationary part of the mechanism, for instance, the ring 7 is provided with pockets, rollers 8 being disposed therein, and a spacer ring $7^a$ encircling the said ring, guiding the rollers. This clutch device is arranged in the interior of an annular flange $10^a$ axially projecting from the left bearing cone 10 of the hub-shell (Fig. 4). The attachment of the clutch ring 7 to the brake sleeve 1 preventing relative rotation is preferably performed by means of a number of keys $1^b$ of the ring 7 engaging axial recesses at the end of the sleeve 1.

The rear faces of the apertures 2 of the brake sleeve wherein the rolls are held, are beveled off inwardly, the inclined faces 6 so formed allowing the rollers to enter the interior of the brake sleeve 1 and to force it outward against the hub barrel 9, when the driving sleeve 4 is rotating backward (see Fig. 3).

The operation of the appliance is as follows. When the rider rotates the pedals of the cycle in the forward direction, whereby a corresponding movement is communicated to the driving sleeve 4 through any one of the ordinary power-transmitting gears, the rollers 3 are moved outward upon the inclined or eccentric faces 4ª of the pockets and couple the driver 4 directly with the hub barrel 9. Should the rotation of the driver be arrested, the inertia of the hub barrel will cause it to overrun the driver and the rollers will be thereby carried to the deeper portion of the pockets 4ª, the wheel consequently running free. The rollers 8 during this operation are at the deeper ends of the pockets in the ring 7 which ascend outwardly in the direction of forward rotation. If the driver be rotated backwardly, the rollers 8 will be projected through the openings in the spacer ring 7ª so as to bind against the rim 10ª of the fixed cone 10, thereby arresting the rotation of the ring 7 and the brake sleeve connected therewith. As the continued backward rotation of the driver carries the rollers 3 across the beveled walls 6 of the brake cylinder, said cylinder will be expanded against the hub-barrel and will brake the same.

It will be readily noted that in my device, the driver is coupled directly to the hub in its forward rotation and is entirely free of the hub during braking.

A form of the invention has been illustrated in the drawings, and disclosed in the foregoing specification, by way of example, but obviously the mechanism may be differently varied without departing from the principle of my invention. I, therefore, do not wish to be limited to the elements shown in the drawings, but

What I claim as my invention, and desire to secure by Letters Patent, is—

1. In a coaster brake for cycles, the combination with the hub barrel and driver therein, of a clutch comprising anti-friction rollers adapted to couple said driver directly to the hub barrel, and an expansible brake-sleeve between the driver and the hub barrel constructed and arranged as a spacer for said rollers.

2. In a coaster brake for cycles, the combination with the hub barrel and driver, of a clutch comprising anti-friction rollers adapted to couple said driver directly to the hub barrel, and an expansible brake-sleeve constructed and arranged as a spacer for said rollers, said brake-sleeve within the hub barrel being revoluble with the clutch on forward rotation of the driver and adapted to be expanded against the hub barrel by said rollers on reverse rotation, and means for preventing rotation of said brake sleeve during the reverse rotation of the driver.

3. In a coaster brake, the combination with a hub barrel, and a driver therein, of a clutch comprising rollers between the hub barrel and the driver adapted to directly couple the same, and an expansible brake sleeve arranged between the hub barrel and the driver and having openings receiving said rollers whereby the brake-sleeve constitutes a spacer for the rollers, said brake sleeve being revoluble with the clutch on forward rotation of the driver and expanded by the rollers on reverse rotation.

4. In a coaster brake for cycles, the combination with the hub barrel and the driver therein, of a clutch mechanism comprising anti-friction rollers adapted to couple said driver directly to the hub barrel, an expansible brake-sleeve constructed and arranged as a spacer for said rollers, and means carried by the driver for coupling said sleeve with a fixed part of the vehicle in one direction of rotation.

5. In a coaster brake for cycles, the combination with the hub barrel and the driver herein, of a clutch mechanism comprising anti-friction rollers adapted to couple said driver directly to the hub barrel, and an expansible brake-sleeve constructed and arranged as a spacer for said rollers and adapted to be expanded against the hub barrel by said rollers on reverse rotation of the driver.

6. In a coaster brake for cycles, the combination with the hub barrel and the driver therein, of a clutch mechanism comprising anti-friction rollers adapted to couple said driver directly to the hub barrel, an expansible brake-sleeve having openings receiving said rollers, whereby said brake-sleeve constitutes a spacer or guide member for the rollers, and means at one end of said sleeve for preventing rotation of the same on reverse rotation of the driver.

7. In a coaster brake for cycles, the combination with the hub barrel and the driver therein, of a clutch comprising anti-friction rollers adapted for coupling said driver directly to said hub barrel, and an expansible brake-sleeve between the driver and the hub barrel having openings receiving said rollers and thereby constituting a spacer therefor, the rear faces of said openings being beveled to be engaged by said rollers for expanding said sleeve when the driver is rotated backward.

8. In a coaster brake for cycles, the combination with the hub barrel and the driver therein, of a clutch mechanism comprising anti-friction rollers adapted for coupling said driver directly to the hub barrel, an expansible brake-sleeve between the driver and the hub barrel constructed and arranged as a spacer for said rollers, said brake-sleeve provided with inclined faces adapted to be engaged by said rollers so as to expand said sleeve on reverse rotation of the driver, and means at the end of the driver for coupling said brake-sleeve with a fixed part of the vehicle during said reverse rotation.

9. In a coaster brake for cycles, the combination with a hub, and a driver therein, of a series of rollers arranged between the hub and the driver and adapted to couple the driver directly to the hub on forward rotation of the driver, an expansible brake cylinder having openings to receive said rollers and thereby form a spacer for the same, a ring at the end of the driver keyed to the brake cylinder, and rollers carried by said ring and adapted to be projected by the same to clutch a fixed part of the cylinder during backward rotation of the driver and thereby prevent rotation of the brake cylinder.

In testimony whereof I have signed my name to this specification in the presence of two subscribing witnesses.

WILHELM MARX. [L. S.]

Witnesses:
OTTO KÖNIG,
CHAS. J. WRIGHT.

Copies of this patent may be obtained for five cents each, by addressing the "Commissioner of Patents, Washington, D. C."